Figure 1:
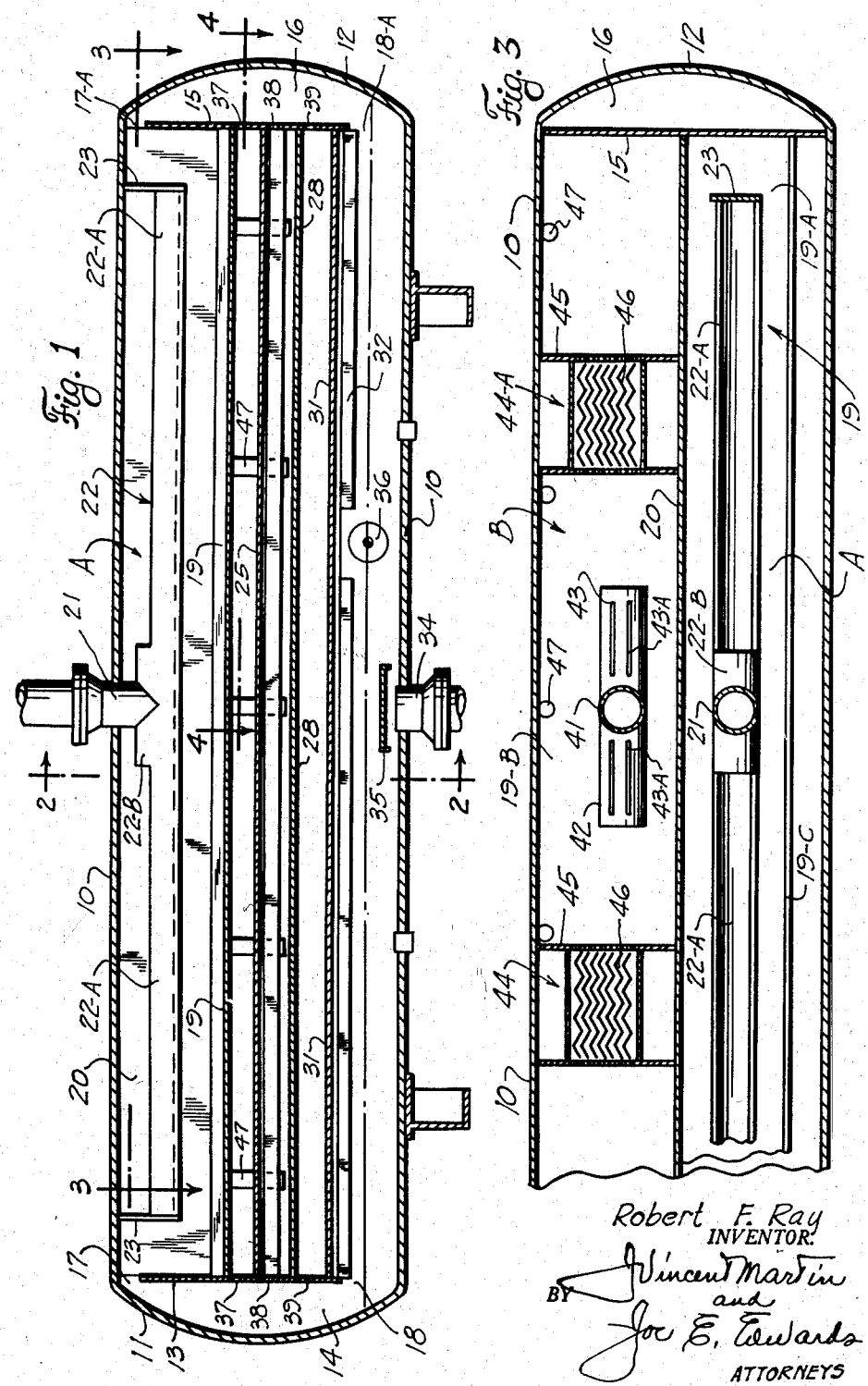

Jan. 27, 1959 — R. F. RAY — 2,870,860
HORIZONTAL OIL AND GAS SEPARATOR
Filed Nov. 5, 1956 — 2 Sheets-Sheet 2

Robert F. Ray
INVENTOR.

BY Vincent Martin
and
Joe E. Edwards
ATTORNEYS

United States Patent Office 2,870,860
Patented Jan. 27, 1959

2,870,860

HORIZONTAL OIL AND GAS SEPARATOR

Robert F. Ray, Houston, Tex., assignor to Parkersburg-Aetna Corporation, Houston, Tex., a corporation of West Virginia Application November 5, 1956, Serial No. 620,359

7 Claims. (Cl. 183—2.7)

This invention relates to new and useful improvements in horizontal separators.

One object of the invention is to provide an improved horizontal separator which is adapted for use in separating gas from heavy crude oil streams and particularly crude oil streams containing considerable gas in suspension therein.

In effecting the separation of gas from crude oil it has been found desirable to cause the flow stream or oil to flow through the separator in a relatively thin layer so that the oil is spread over the flow trays to a shallow depth, whereby the entrained gas is thereby given the opportunity to be released from the surface of the oil. Obviously, separation efficiency is increased when the tray surface is increased and various types of tray arrangements have been suggested in the past, one example of which is illustrated in the prior patent to Glasgow, No. 2,586,221. However, where a horizontal type of vessel is employed, it has been the practice to dispose the trays in a manner to conduct the flow in a generally longitudinal path within said vessel and such arrangement definitely limits the area of the tray surface because the number of longitudinally extending, inclined trays which may be disposed in a cylindrical vessel is restricted.

It is, therefore, an important object of this invention to provide a horizontal oil and gas separator having a flow tray arrangement in which the flow path of the flow stream is in a direction transversely of the vessel, rather than longitudinally of said vessel as has been the usual practice; the arrangement permitting an amplified tray area to be presented to the flow stream, whereby separation efficiency and capacity is increased.

Another object is to provide a horizontal oil and gas separator having a plurality of elongate trays which are disposed in superposed relationship within the interior of the vessel, said trays being alternately inclined in a direction transversely of the vessel and means for directing the flow stream along the upper surfaces of the trays so that the flow path of the flow stream is tranversely of said vessel; the inclination of the trays with respect to a plane transversely of the vessel making it possible to impart the desired fall to the stream while utilizing only a minimum vertical space within the vessel, whereby an increased number of trays may be mounted within a given size vessel.

A further object is to provide a horizontal oil and gas separator having flow trays inclined with respect to a plane transversely of the separator vessel, together with an inlet assembly which evenly distributes the incoming stream over the longitudinal area of the uppermost tray whereby the flow is spread in a relatively thin layer over said tray; the other trays of the separator each having means for maintaining the liquid flowing thereover in a relatively thin layer to enhance separation of gas from the liquid.

Still another object is to provide a separator, of the character described, having a gas outlet chamber in communication with those areas between the trays into which the separated gas flows, whereby the separated gas may be readily conducted from the separator; said chamber having a suitable mist extractor or extractors mounted therein to remove any liquids which may be entrained in the separated gas.

The construction designed to carry out the invention will be hereinafter described, together with other features thereof.

Figure 2:
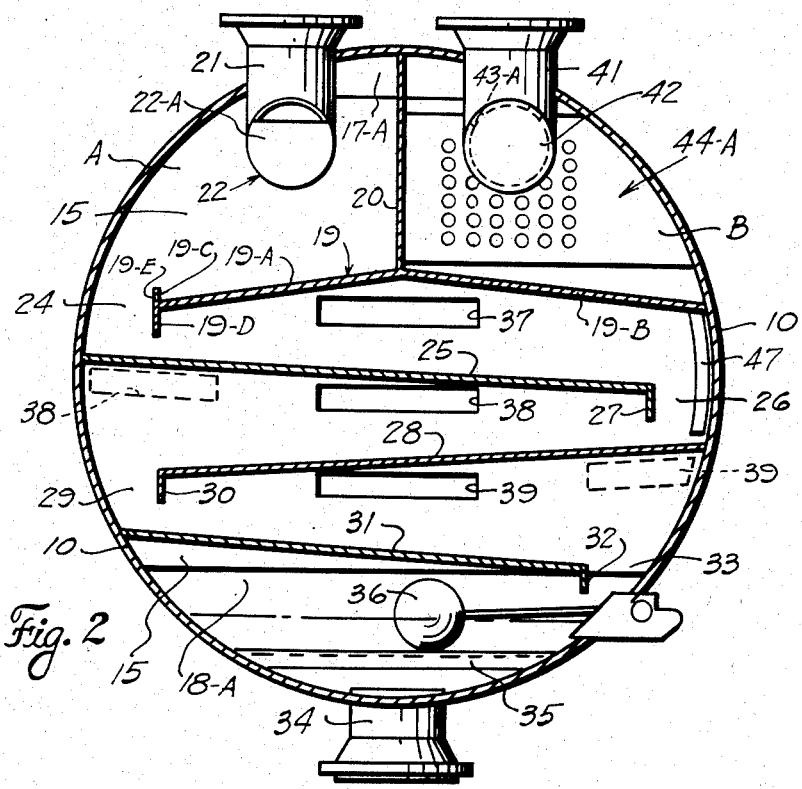
Figure 4:
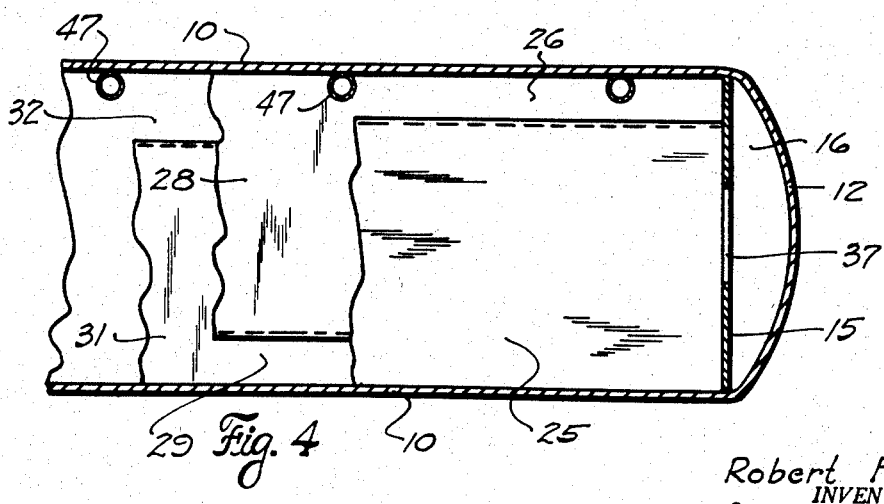

The invention will be more readily understood from a reading of the following specification and by reference to the accompanying drawings forming a part thereof, wherein an example of the invention is shown, and wherein:

Figure 1 is a longitudinal, sectional view of a horizontal oil and gas separator, constructed in accordance with the invention, Figure 2 is a transverse sectional view, taken on the line 2—2 of Figure 1, Figure 3 is a longitudinal, sectional view, taken on the line 3—3 of Figure 1, and Figure 4 is a partial, longitudinal, sectional view, taken on the line 4—4 of Figure 1.

In the drawings, the numeral 10 designates an elongate, horizontal, cylindrical tank or vessel 10 having its ends closed by heads, or closures, 11 and 12. A partition 13 which extends transversely across the interior of the tank is located adjacent the end 11 and forms an end compartment 14 at that end of the vessel. A similar partition 15 extends tranversely across the interior of the tank at that end adjacent the head, or closure 12, to form an end compartment 16. The partition 13 terminates short of the top of the tank whereby an opening 17 which communicates with the compartment 14 is provided; similarly the lower end of the partition 13 terminates short of the bottom of the tank to form an opening 18 which establishes communication with the lower portion of the end compartment 14. Similarly the partition 15 terminates short of the upper end of the tank to provide a flow opening 17-A, while its lower end terminates short of the bottom of the vessel to form a flow passage, or opening 18-A at the lower end of the compartment 16.

The tray assembly which will be hereinafter described in detail is mounted within the vessel between the end partitions 13 and 15, as is clearly shown in Figure 1. This tray assembly includes an uppermost tray 19 which extends longitudinally between the partitions 13 and 15, and which has its opposite sides inclined with respect to a transverse plane, said tray including a downwardly inclined section 19-A which is on one side of the vertical center line through the vessel and a similar downwardly inclined section 19-B which is on the opposite side of said center line. An upwardly extending plate 20 has its upper end secured to the wall of the vessel with its lower end secured to the central portion of the uppermost tray, and this plate extends throughout the entire length of the vessel between the end partitions 13 and 15 (Figure 2). The plate 20 divides the space above the uppermost tray 19 into a flow stream inlet area A, and a gas outlet area B. An inlet pipe 21 is mounted in the upper portion of the tank and extends into the flow stream inlet area A. The lower portion of the inlet pipe has communication with an elongate distributor pipe 22. The pipe 22 has its ends supported by suitable brackets 23 which depend from the upper portion of the vessel, and as is clearly shown in Figure 1, the pipe 22 extends substantially in overlying relationship to the uppermost tray 19. For the purpose of directing the stream which is introduced through the inlet pipe 21 along the longitudinal area of the uppermost tray 19, the upper section of the pipe 22 is cut away as indicated at 22-A whereby the cutaway portions of the pipe actually form a U-shaped trough. Therefore, as the well stream flowing into the vessel through the inlet pipe 21 is conducted into the pipe 22, it flows along said pipe and then overflows over the sides of the trough-like sections of said pipe. The fluid stream is thus distributed substantially evenly over the entire length of the section 19–A of the uppermost tray 19 which is disposed in the lower portion of the inlet area A.

The longitudinal edge of the inclined section 19–A of the tray 19 terminates in spaced relationship to the inner wall of the vessel and is provided with a longitudinal upstanding flange 19–C and a depending flange 19–D. The flange 19–C functions to prevent the fluid stream from quickly discharging from the end of the tray section 19–A and causes a buildup of a thin layer of liquid on the upper surface of said tray, whereby the liquid is actually spread over the length of the tray section 19–A. As the liquid overflows, the upstanding longitudinal flange 19–C at the longitudinal edge of the tray section 19–A, it will flow downwardly through the space 24 and will strike a second tray 25 which is located below the upper tray 19. The tray 25 also extends longitudinally between the end partitions 13 and 14, and is inclined with respect to a plane transversely of the vessel; however, it will be noted that the inclination of the tray 25 is opposite to the inclination of the section 19–A of the uppermost tray, and thus, as the liquid, or stream drops off of the tray 19, it will then flow downwardly along the upper surface of the tray 25. Since the arrangement of the distributor pipe 22, and the arrangement of the section 19–A of the uppermost tray, has spread the liquid throughout the length of the uppermost tray, the overflow from the uppermost tray will be upon the entire length of the next tray therebelow, which is the tray 25.

The longitudinal edge of the tray 25 is terminated short of the wall of the vessel to provide a flow space 26 and this longitudinal edge is formed with a depending flange 27. Thus, the liquid which flows over the upper surface of tray 25 in a relatively thin layer will drop off of the longitudinal edge portion and will be deposited upon a third tray 28 which is located below the tray 25. The tray 28 is inclined with respect to a plane transversely of the vessel, and its inclination is opposite to that of the immediately above tray 25, but is substantially in the same direction of inclination as the section 19–A of the uppermost tray. Thus, the stream or liquid is caused to move downwardly by gravity along the upper surface of tray 28 which has its longitudinal edge terminating short of the vessel wall to form a flow area 29. A depending flange 30 is formed on the longitudinal edge of the tray 28.

Below the tray 28 is another tray 31 which is of substantially the same construction in that it is disposed to extend between the end partitions 13 and 15, and has an inclination with respect to a plane transversely of the vessel; the inclination of tray 31 is substantially that of the tray 25, but is opposite to the alternating trays 28 and 19. The longitudinal edge of tray 31 is formed with depending flange 32 which is spaced from the wall of the vessel to form a flow area 33 whereby the liquid may flow into the bottom portion of the vessel 10. From this bottom portion, the liquid may escape through a liquid outlet 34 which has its upper end disposed below a shield, or vortex preventer 35, which may be suitably secured in position within the tank. A suitable float means 36 is provided to maintain a desired liquid level within the lower portion of the tank.

From the foregoing it will be seen that the well stream is introduced through the inlet pipe 21 and said stream is deposited over the length of the uppermost tray section 19–A. The stream is spread in a relatively thin area on this tray section which provides an opportunity for any gas entrained in the liquid to be separated from. The flow stream then passes successively over the smooth, uninterrupted surfaces of the inclined trays 25, 28, and 31 and during the passage of the stream over the upper surfaces of said trays, gas is given the opportunity to be separated from the oil. The liquids finally are deposited in the lower portion of the tank where a predetermined liquid level is maintained by the float 36. As explained, the liquid is conducted from the vessel through the oil outlet 34.

Gas will be separating from the flow stream throughout its travel path within the vessel and any gas which escapes in the inlet area A will pass upwardly to the upper portion of the vessel and will then flow through the flow areas 17 and 17–A into the end compartments 14 and 16. This permits the gas to pass around the divider plate 20 and then into the gas outlet area B which is also in communication with the passages 17 and 17–A formed by terminating the partitions 13 and 14 short of the upper end of the vessel.

Any gas which is separated from the liquids as the same flow over the tray 25 rise upwardly into the area below the tray 19 and may escape through openings 37, which are provided in the partitions 13 and 14 and which communicate with the end compartments 15 and 16. As noted, any gas within the end compartments may pass through the areas 17 and 17–A and into the gas outlet area B. Similar openings 38 and 39 are provided above the trays 28 and 31. Any gas rising from the maintained liquid level in the lower portion of the vessel below the tray 31 may also escape into the end compartments 15 and 16 through the flow areas 18 and 18–A and is thereafter conducted into the gas outlet area B.

The gas escape openings 38 and 39 which establish communication with the end compartments 14 and 16 have been illustrated as mounted in substantially the central portion of the partitions; however, it is pointed out that these openings may be provided at any point in the partitions 13 and 15 as may be desired to conduct the separated gas into the end compartments. In Figure 2 the openings 38 and 39 may be located as shown by the dotted line positions which would be at the uppermost point immediately below the tray thereabove. This is the highest point in the area where the gas is escaping.

After the gas is conducted into the end compartments 15 and 16 it flows upwardly in said compartments and then passes into the gas inlet area B. This area, as is illustrated in Figures 2 and 3, is a longitudinal chamber which extends between the partitions 13 and 14. At the central portion of this chamber is a gas outlet pipe 41 which is provided with lateral legs 42 and 43; said legs have elongate slots 43A in their upper portions so that gas from the extreme upper end of the chamber passes into the outlet, whereby the lateral legs function as a gas vortex preventer. Disposed between the lateral leg 42 and the end compartment 14 is a mist extractor which is generally indicated at 44. This mist extractor may be of any desired construction, but preferably includes a supporting casing 45 having a series of offset baffles 46 disposed therein. As the gas moves from the compartment 14 through the mist extractor toward the gas outlet 41, any liquids which are entrained in the gas stream will be contacted by the baffles and will thereby be removed. The liquids separated by the mist extractor will fall downwardly onto the section 19–B of the uppermost tray 19 and will be conducted from the gas inlet area through suitable drainpipes 47 which extend downwardly from the upper tray section 19–B to a point just above the intermediate tray 28. Thus, the liquids are returned into the vessel to again travel across the upper surfaces of trays 28 and 31, and then discharged into the lower portion of the vessel.

A similar mist extractor 44–A is disposed between the compartment 16 and the gas outlet 41, so that any gas flowing from the compartment 16 will pass through the mist extractor before it escapes through said outlet.

The operation of the apparatus will be evident from the foregoing. The flow stream, which may be crude, or heavy oil, is introduced through the inlet 21 and is caused to traverse the inclined trays 19-A, 25, 28, and 31. The inclination of the trays is such that the liquid will flow over the upper surfaces of the trays in a relatively thin layer which enhances the opportunity of the gas to be separated therefrom. The liquid is deposited in the lower portion of the vessel 10 and a predetermined liquid level is maintained in said vessel. The gas which is separated from the liquids as they traverse the trays is conducted into the end compartments 14 and 16, and from these compartments is permitted to flow into the gas outlet area B. In passing from the compartment 16 to the gas outlet 41, the gas is caused to pass through the mist extractor 44-A whereby entrained liquids are removed therefrom. Similarly, gas from the other end compartment 14 must pass through the mist extractor 44 before reaching the gas outlet 41. The liquids which are removed by the mist extractors are deposited upon the inclined section 19-B of the uppermost tray and are then returned through the drainpipe 47 into the vessel, to ultimately be deposited in the lower portion thereof.

It is pointed out that by inclining the flow trays with respect to the transverse plane extending through the vessel, the flow trays are of substantially less width than they are of length, and therefore the vertical space required to incline transversely extending trays is much less than if longitudinal trays are employed. For this reason, the required fall, or inclination, may be obtained for each tray while utilizing a minimum vertical space within the vessel. This makes it possible to increase the number of trays which may be employed in a given size, or diameter, or vessel, and results in a greater surface area exposed to the flow stream. It is, of course, evident that the greater the surface area over which the liquids must travel, the more efficient is the separation because the liquid is held within the vessel for a longer time and this increased time enhances the efficiency of the gas separation. It might be pointed out that the depending flanges 19-D, 27, 30, and 32 which are formed on the respective trays are provided for the purpose of trapping a layer of gas beneath each tray so that said gas is forced to escape outwardly through the openings 37, 38, 39 and 18 into the end compartments 14 and 16. An upwardly extending flange 19-C has been shown on the inclined section 19-A of the uppermost tray 19, and if desired a similar flange may be provided on the other trays to maintain a small layer of liquid on said trays. Where the flanges are employed, said flanges are formed with slots 19-E at spaced points therealong, whereby the tray will be self-cleaning and sedimentary material will not accumulate on the upper surfaces of the tray. The smooth uninterrupted surfaces of trays renders the same self-cleaning and also provides for smooth uninterrupted flow.

In some instances it might be desirable to form a deflector assembly, or a coalescing pack within the central portion 22-B of the distributor pipe 22-A. However, it has been found that since the flow stream is introduced through the inlet 21 into the central portion 22-B and is then caused to change its direction to flow longitudinally into the trough-like sections 22-A of the pipe 22, that this arrangement actually is a deflector assembly. It slows down the flow and gives free liquids and gases an opportunity to be separated.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. A horizontal oil and gas separator, including, an elongate cylindrical vessel having closed ends, two interior partitions within the vessel and spaced from each end thereof whereby end compartments are formed at the end of the vessel, a first flow tray extending longitudinally between the partitions and forming an upper longitudinal chamber above the tray, a vertically disposed divider within the chamber dividing the same into a flow stream inlet area and a gas outlet area, a flow stream inlet extending into the inlet area, a gas outlet extending from the gas outlet area, that portion of the first flow tray below the inlet area inclining transversely downwardly with respect to a horizontal plane, and having its longitudinal edge spaced from the vessel wall, whereby the flow stream from the inlet is deposited upon the tray and flows downwardly along the upper surface to be discharged over said longitudinal edge, a plurality of additional flow trays below the first tray extending between the partitions and also inclined transversely downwardly with respect to a horizontal plane, alternate trays being inclined in opposite directions whereby the flow stream is conducted successively downwardly over the surfaces of the trays and gas is separated from the liquid, an oil outlet in the lower portion of the vessel for conducting separated liquid from the vessel, and means for establishing communication between the gas outlet area in the upper portion of the vessel and those areas above the trays into which separated gas passes.

2. A horizontal oil and gas separator as set forth in claim 1, together with means on each flow tray for spreading the liquid in a relatively shallow layer on the upper surface thereof to facilitate separation of the liquid and gas.

3. A horizontal oil and gas separator as set forth in claim 1, together with means for maintaining a predetermined liquid level in the lower portion of the vessel.

4. A horizontal oil and gas separator as set forth in claim 1, together with means within the flow stream inlet area and communicating with the inlet for distributing the incoming stream evenly throughout the length of the inclined portion of the first tray.

5. A horizontal oil and gas separator as set forth in claim 1, wherein the means establishing communication between the gas outlet area and the areas above the trays comprises openings in the partitions whereby the separated gas is conducted into the end compartments and from such compartments is conducted into the gas outlet area.

6. A horizontal oil and gas separator as set forth in claim 1, wherein the means establishing communication between the gas outlet area and the areas above the trays comprises openings in the partitions whereby the separated gas is conducted into the end compartments and from such compartments is conducted into the gas outlet area, and means for maintaining a predetermined liquid level in the lower portion of the vessel.

7. A horizontal oil and gas separator, including, an elongate cylindrical vessel having closed ends, a first flow tray extending longitudinally between the closed ends and forming an upper longitudinal chamber above the tray, a vertically disposed divider within the chamber dividing the same into a flow stream inlet area and a gas outlet area, a flow stream inlet extending into the inlet area, a gas outlet extending from the gas outlet area, that portion of the first flow tray below the inlet area inclining transversely downwardly with respect to a horizontal plane and having its longitudinal edge spaced from the vessel wall, whereby the flow stream from the inlet is deposited upon the tray and flows downwardly along the upper surface to be discharged over said longitudinal edge, a plurality of additional flow trays below the first tray extending between the closed ends and also inclined transversely downwardly with respect to a horizontal plane, alternate trays being inclined in opposite directions whereby the flow stream is conducted successively downwardly over the surfaces of the trays and gas is separated from the liquid, an oil outlet in the lower portion of the vessel for conducting separated liquid from the vessel, and means for establishing communication between the gas outlet area in the upper portion of the vessel and those areas above the trays into which the separated gas passes.

References Cited in the file of this patent

UNITED STATES PATENTS

| | | |
|---|---|---|
| 1,581,371 | Weisgerber | Apr. 20, 1926 |
| 2,656,896 | Glasgow | Oct. 27, 1953 |
| 2,748,884 | Erwin | June 5, 1956 |